Oct. 18, 1927.

T. W. GREEN

ELECTRIC SUCTION SWEEPER

Filed May 25, 1921

Witness:
Walter Chism

Inventor.
Thomas W. Green.
by
Attorney.

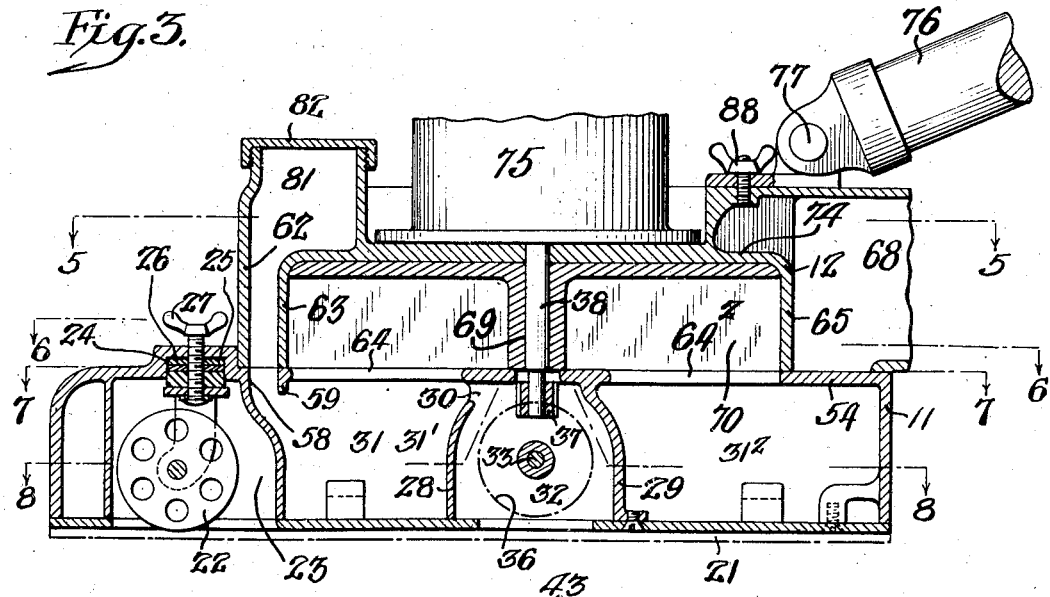

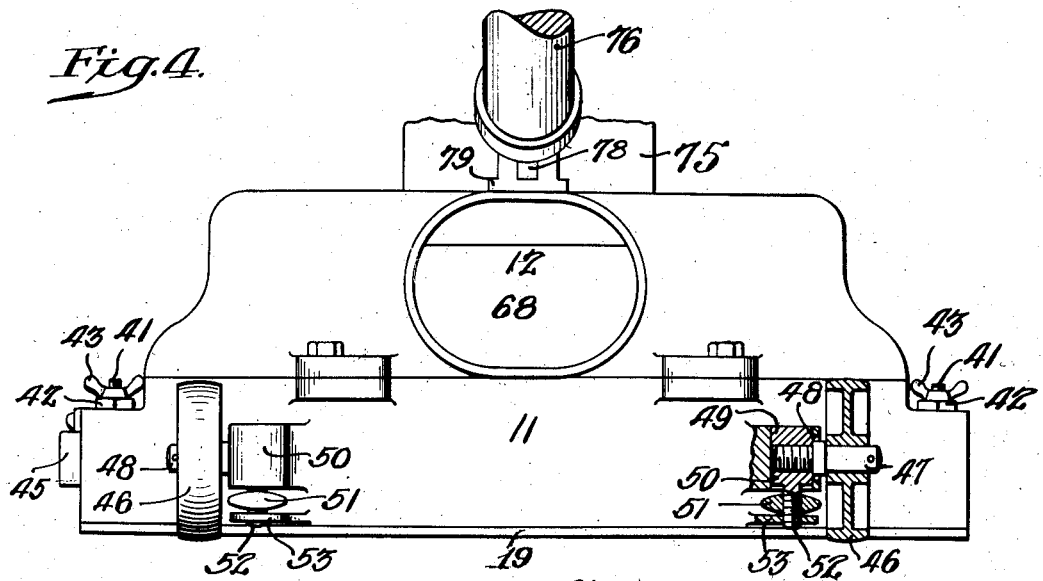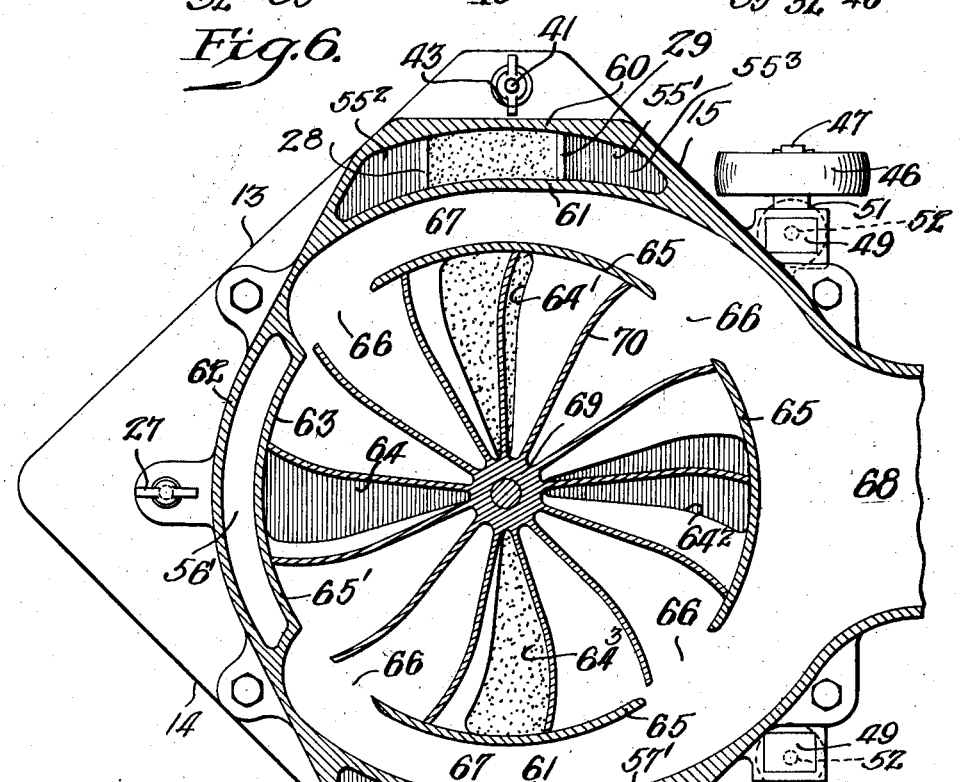

Oct. 18, 1927.  
T. W. GREEN  
1,646,088  
ELECTRIC SUCTION SWEEPER  
Filed May 25, 1921   5 Sheets-Sheet 4
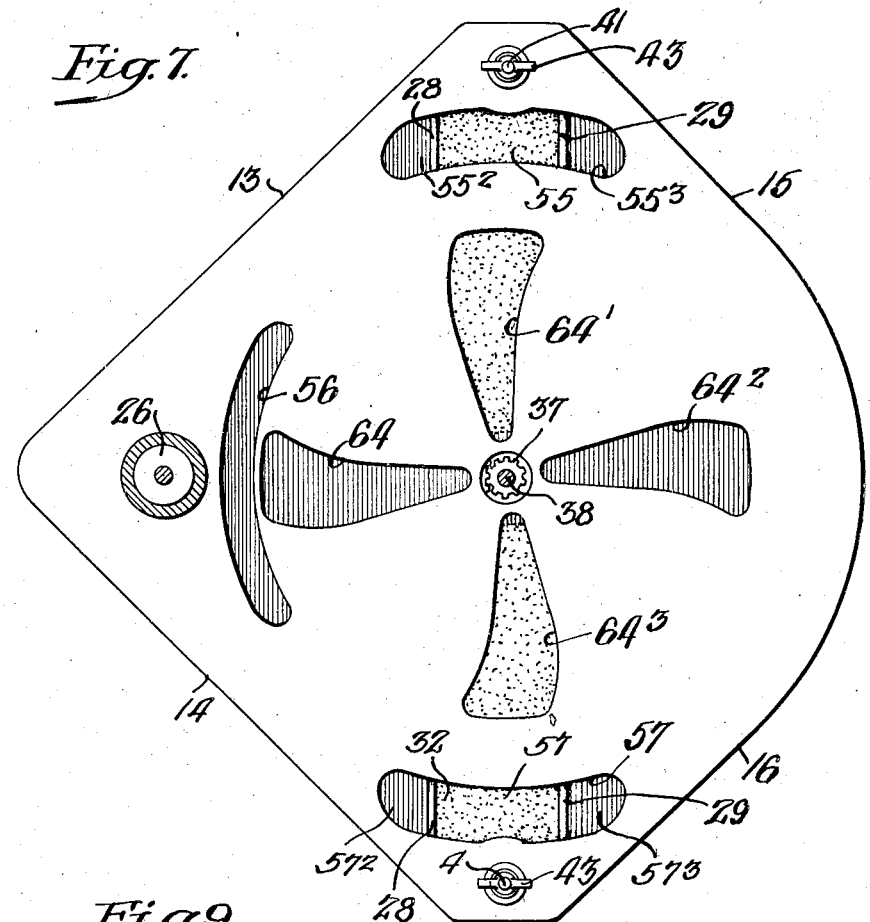
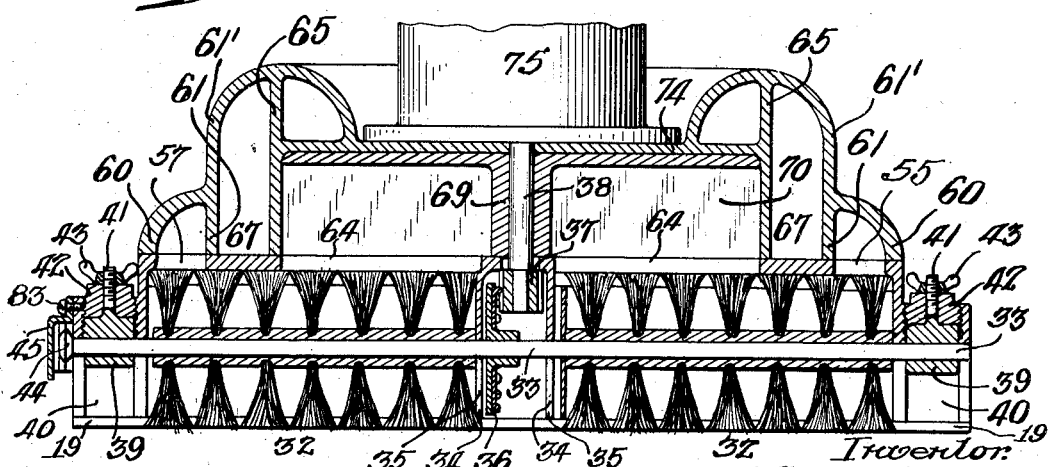

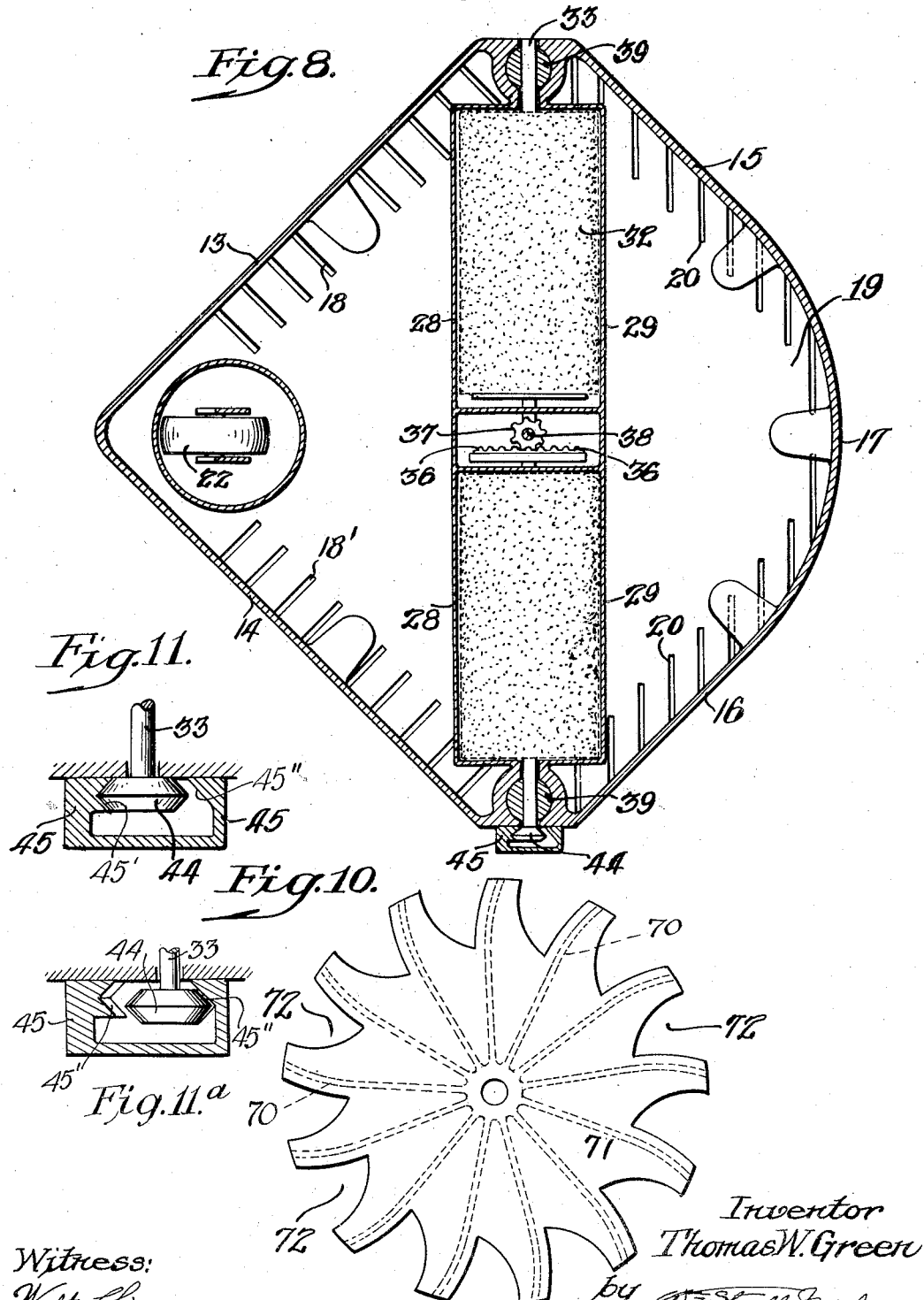

Patented Oct. 18, 1927.

1,646,088

UNITED STATES PATENT OFFICE.

THOMAS W. GREEN, OF WESTMONT, NEW JERSEY, ASSIGNOR TO THOMAS WILBRAHAM GREEN ENGINEERING CO., OF PHILADELPHIA, PENNSYLVANIA, A CORPORATION OF PENNSYLVANIA.

ELECTRIC SUCTION SWEEPER.

Application filed May 25, 1921. Serial No. 472,451.

My invention relates to electric vacuum sweepers of the type used for hand operation in the home.

The main purpose of my invention is to connect the fan element as directly as possible with the inlet openings, gaining a maximum of fan effort and a minimum of fluid friction.

A further purpose is to apply central inlet and edge distribution to a fan blower positioned directly over air inlet ports.

A further purpose is to increase the area of cross section of the ducts leading from the air inlet to the fan.

A further purpose is to break the fluid inlet up into a series of short spaced separate inlets, preferably distributed substantially throughout the circumference of the sweeper.

A further purpose is to provide separate spaced fluid inlets at the edge of the sweeper which are diagonal to each other and hence some of them diagonal to whatever direction of travel be given the sweeper.

A further purpose is to improve the mounting of a beating brush and also its adjustment and connection or disconnection.

Further purposes appear in the description and claims.

I have preferred to illustrate my invention by but one form thereof, selecting a form which is practical, highly efficient, simple and of long life and which at the same time well illustrates the principles of my invention.

Figure 3 is a section of Figure 2 taken upon line 3—3.

Figure 4 is a rear end elevation, partly broken away, showing this preferred form of my invention.

Figures 5, 6, 7 and 8 are sections of Figure 3 upon lines 5—5, 6—6, 7—7 and 8—8 respectively.

Figure 2:
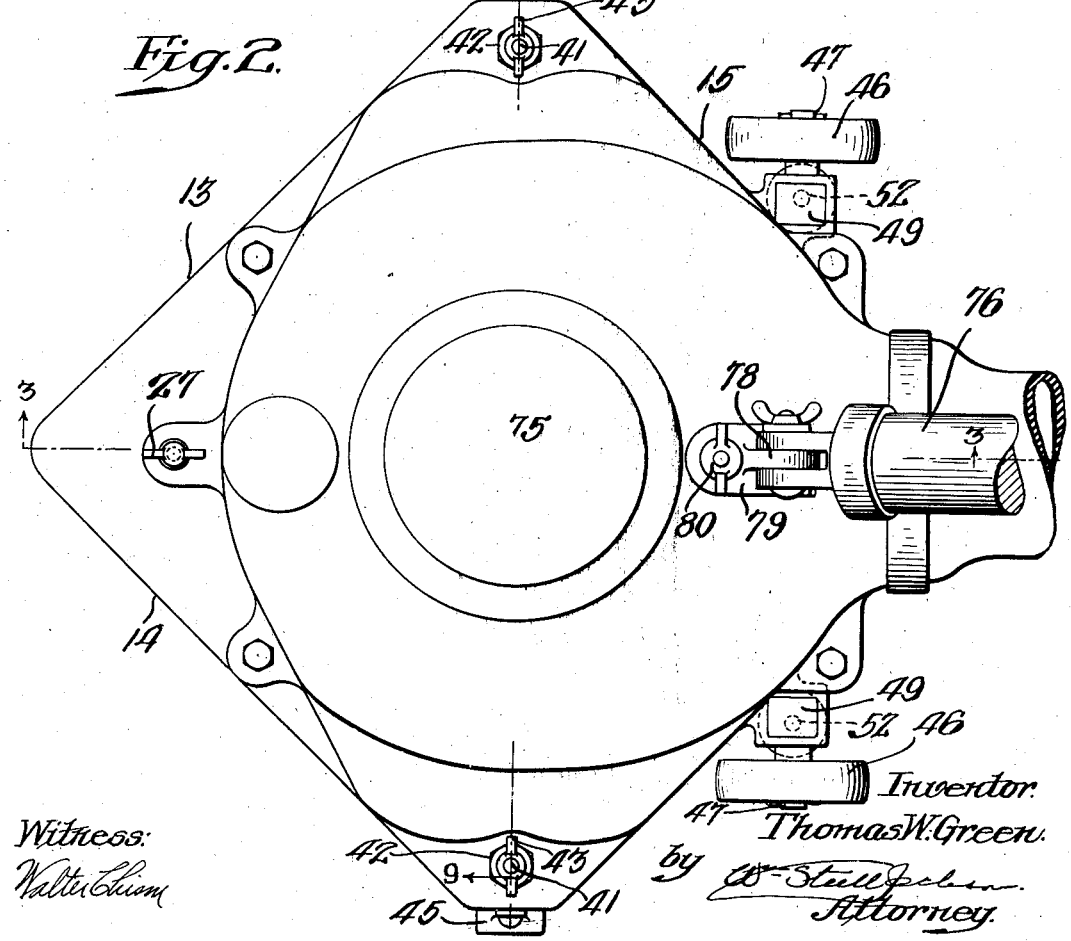
Figure 2 is a top plan view of the structure seen in Figure 1.

Figure 9 is a section of Figure 2 upon line 9—9.

Figure 10 is a top plan view of the fan element.

Figure 11 is a section of the brush-controlling cam.

Figure 11$^a$ is a section corresponding to Figure 11 but with the parts in different positions.

In the figures, similar numerals indicate like parts.

Vacuum cleaners may be roughly divided for one purpose into those having a high vacuum and a small flow of inlet air at relatively high velocity and those having a low vacuum, commonly called suction sweepers and in which a large volume of inlet air flows much more slowly. The latter type is particularly affected by undesirable length of passage and unnecessary restriction thereof. Keeping this in mind I have aimed particularly at as direct application as possible of the motor to its duty, avoiding turns and all restrictions other than those necessary at the inlets adjacent to the floor.

Without intending to restrict myself to the form shown, and using it as an illustration only, I will now describe the best form of my invention known to me.

Figure 1:
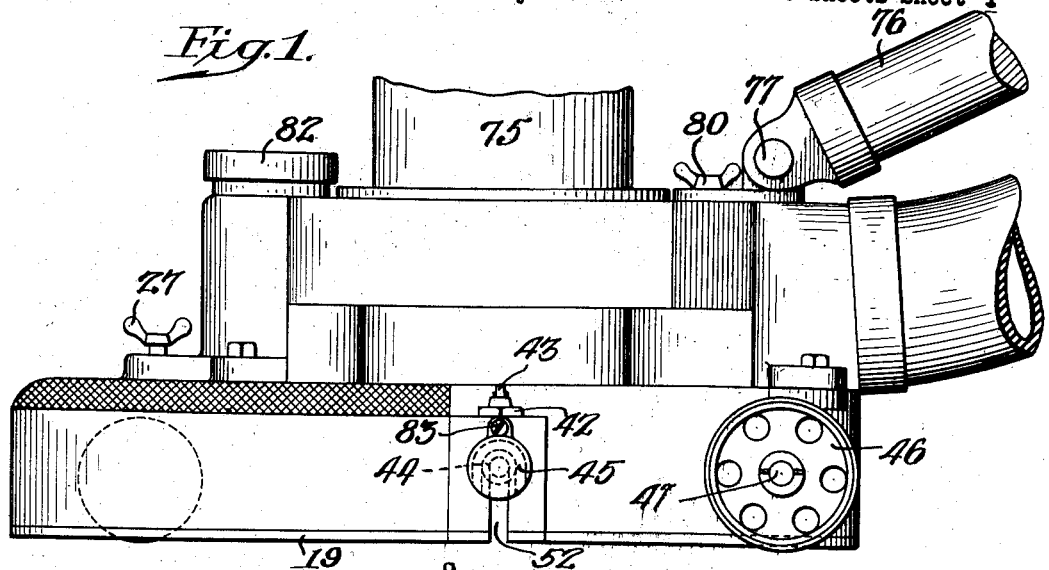
Figure 1 is a side elevation of this preferred form of my invention.

The frame of the sweeper is made up of two main parts, a lower intake of section shown at 11, and an upper section supporting the motor and shown at 12. The intake section is preferably of nearly square shape, having front faces 13 and 14 presented diagonally to the preferred direction of travel (across the sheet in Figures 1 and 2) and rear faces 15 and 16 also diagonal to this direction and meeting in a curved rear surface 17.

In the illustration, Figure 8, it will be seen that the inlet ports 18 and 18' in plate 19, are composed of slits at an angle to their respective adjoining faces and to each other and generallly diagonal to the direction of movement. The ports 20 are diagonal to the ports 18 and 18', affording some ports substantially perpendicular to any direction of movement and some diagonal thereto and applying almost the entire circumference of the sweeper to air inlet without an excessive air inlet at any one point.

The air inlets may be closed by a plate 21 held in place as by any suitable means when the hose attachments are in use.

The rectangular shape makes it convenient to operate the sweeper in corners and against flat side surfaces, giving a maximum range of surface over which it can be applied.

The front roller 22 is mounted within a space 23, cut off from the suction and large enough to allow the roller to swing as well as to turn freely, accommodating itself to the movement of the sweeper. It is mounted to revolve bodily about a threaded spindle 24 passing through a space 25. This space 25 may be filled in by washers 26 or other packing material so that the thumb nut 27 will tighten the roller to the desired projection below the bottom plane of the sweeper, making the height from the floor adjustable in this manner.

Extending transversely across the approximate middle of the lower section are walls 28 and 29 forming a compartment communicating through parts 30 with the space 31. Within this compartment is located brush 32 whose mounting is best seen in Figure 9. This brush is mounted upon a spindle 33 supported laterally by plates at 34, which permits vertical movement through slot 35 but prevents lateral movement. The spindle carries a crown gear 36 meshing with a spur gear 37 upon the lower end of the fan shaft 38.

At opposite ends the spindle 33 is mounted in bearings 39 which are seated in vertically-extending guiding openings 40. Perpendicular to the paper in Figure 9 these openings are of circular cross section as best seen in Figure 8. The bearings are connected with threaded pins 41 passing through plugs 42 which are screwed into the threaded upper ends of these openings 40. When the bearings 39 are brought tight up against the plugs 42 by the thumb nuts 43, they are rigidly secured to these plugs. The height of the ends of the spindle 33 may therefore be adjusted by slackening thumb nuts 43, adjusting the heights of the plugs 42 and again tightening the thumb nuts.

The partition walls 34 give lateral support to the spindle while permitting movement through the walls to accommodate the vertical adjustment of the brush.

The spindle 33 is longitudinally movable to effect engagement and disengagement of the crown and spur gears and carries at one end a head 44 with which a cam 45 engages, to move the spindle positively in either direction. This cam structure is shown best in Figures 9 and 11 and 11ª.

At the rear of the structure upon opposite sides are mounted rollers 46 which are supported upon spindles 47 extending laterally through slots 48 from plugs 49 of non-circular cross section. The plugs fit in non-circular recesses 50 and are adjusted in them by nuts 51 upon screws 52. The nuts bear upon rigid plates 53 and the screws are guided in openings within the plates.

The lower compartment providing space 31 is partly closed at the top by a cover plate 54 which is apertured to form two sets of passages communicating with the upper compartment.

The one set is shown in the openings 55, 56 and 57. The limiting walls of opening 56 are seen in cross section at 58, 59 in Figure 3, but the passages themselves are best seen in Figure 7. In the upper compartment the limiting walls corresponding to openings 55 and 57 are seen at 60, 61, 60', 61' and those of opening 56 are seen at 62 and 63 (Figure 6).

The other set of openings comprises fan inlets directly beneath the fan, all of like character and shown at 64, 64', 64², 64³, Figures 6 and 7, and of any desired number and preferably uniform spacing beneath the fan blades so as to provide direct intake therefor.

The upper compartment provides openings 55', 56', 57' corresponding to 55, 56 and 57 and also a discontinuous circumferentially-extending wall 65 interrupted by lateral openings forming outlets at 66 into a passage 67 communicating with the main discharge outlet 68. One of the walls 65, shown at 65', is used as a boundary wall 63 for the passage 56'. The fan 69 is provided with blades 70 and with a partly closed top 71 within which are cuts or slashes 72 providing outlet not only laterally through the passages 66, but vertically through the slashes 72 into communication with the passage 67 and outlet 68. The communication between the cuts 72 and the outlet is made through openings 73 in the top wall 74 of the upper compartment. This wall affords a base for the motor 75 by which the fan and gear 36 are operated.

I have not considered it necessary to illustrate the motor in detail, nor to show the electrical connections as these are well known in the art and do not comprise any part of my invention.

The handle 76 is pivoted at 77 to an ear 78 upon a plate 79 and this plate is held to the body of the sweeper in the desired position of lateral adjustment by a pivot bolt and thumb nut shown at 80.

The space 31 is connected through passages 56 and 56' with a tubular inlet 81 normally closed by cap 82. This is intended for connection of a fitting with the tubular inlet when it is desired to connect the suction mechanism of the sweeper with a nozzle for cleaning tapestries, etc.; in which case the bottom openings are closed by a plate 21.

In operation, the cap 82 is normally in position and the plate 21 is removed to expose the inlet ports 18, 19 and 20. The brush is connected for operation or disconnected, respectively, by shifting the cam 45 about its supporting pivot 83. The shifting of the cam from left to right in Figures 11 and 11ª wedges the head 44 axially by engagement with surface 45' forcing the head from the position of Figure 11ª to that in Figure 11. With movement of the cam 45 from right to left in these figures the surface 45″ of the cam engages the head and shifts the head axially from the position shown in Figure 11 to that shown in Figure 11ᵃ. It will thus be seen that the cam controls the shifting of the head and consequently the shifting of the shaft 33 and the engagement or non-engagement of face gear 36 with pinion 37.

The electric current is turned on by any convenient switch and rotation of the fan causes the air in the space 31 to be drawn up through the openings 64 into the space between the fan blades and to be discharged laterally through the ports or outlets 66 and passages 67 and upwardly and outwardly through the openings 72 and the upper part of passages 67. The air thus handled is finally discharged through the main outlet 68 which may be connected with any discharge nozzle or container as in existing constructions.

This exhaust of the air from space 31 causes suction through the inlet openings 18, 19 and 20 and, to any extent determined by the size of the openings also through the lower part of the brush compartment.

It will be noted that transverse division of the lower compartment by walls 28 and 29 separates the right and left hand portions of space 31 which for this purpose may be viewed as two compartments 31′ and 31². The extent to which these are separated will depend upon the height of these walls and the thickness of the brush lying between them.

Suction from the lower portion of the sweeper into the fan takes place freely from the space 31′ and 31² respectively through ports 64 at the left and right in Figure 3 and from the brush space to ports 64′ and 64³ shown at the top and bottom in Figure 6 providing a porting space which is relatively enlarged to compensate for the partial closure due to the pressence of the brush at this point.

In case of any relative crowding of the air through ports 64 and 64² at the left or right in Figure 3, and to equalize the passage of air through these two ports where the connection at 81 is used as a suction inlet, air is permitted to travel across from the compartment 31′ to the compartment 32′ through the ports 55 and 57 from the ends 55² and 57² which are in unobstructed communication with the compartment 31′, up into the upper compartment and across over the top of walls 28 and 29 and the brush to ends 55³ and 57³ which are in unobstructed communication with compartment 31² and hence, with the right hand port 64² of Figure 3.

Since the handle can be swung to operate the sweeper in a direction perpendicular to either of its sides 13 or 14 as well as diagonally thereto—though not to the best advantage on account of the rear wheel construction—the sweeper can be operated directly toward or parallel with any side wall and readily enters a corner.

During the normal operation diagonal to faces 13 and 14, the ports along these two walls are diagonal to the directions of the movement while the ports 20 are perpendicular to the directions of movement, giving a very desirable combination of operating lines of suction and completely covering the space operated upon, most of it by several different ports.

I recognize that others skilled in the art, in view of my disclosure will be able to present all or a part of my invention in varying forms differing according to the preference of the individual, the individuality and skill of the designers or the extent of their desire to obtain the advantage of my invention without paying tribute to me; and it is, therefore, my intention to include herein all such forms as come within the fair spirit and scope of my invention.

Having thus described my invention, what I claim as new and desire to secure by Letters Patent is:—

1. In a suction sweeper, a motor having a shaft, a fan mounted upon the motor shaft, a gear directly connected with said shaft, a rotary brush, a shaft and bearings therefor, a gear carried by the brush shaft adapted to engage the first gear and positive cam-operated means for moving the brush and shaft endwise to engage the two gears or disengage them as required.

2. In a suction sweeper, walls forming an inlet compartment having its front walls at an angle to each other to form sides, apertured in the bottom adjacent to these sides at an angle to the nearest adjacent sides and having the apertures therein directed at an angle, those near one side to those near the other, in combination with a fan communicating with said inlet compartment, and discharging through the outlet for the suction sweeper, and a motor for said fan.

3. In a suction sweeper, walls forming an inlet having angularly placed sides at the front, a fan compartment and a motor support, the inlet compartment being slitted at intervals along the bottom near the angularly placed sides at an angle to the adjacent sides and the slits near one side being at an angle to the slits near the other, and apertured between the inlet and fan compartments at the bottom of the fan compartment, in combination with a fan within the fan compartment and a motor mounted upon the casing axially in line with the fan.

4. In a suction sweeper, a brush adapted to be rotated, a shaft upon which said brush is mounted, gearing for operation of the shaft engaged and disengaged by longitudinal movement of said shaft and positive hand-actuated means for shifting said shaft.

5. In a suction sweeper, a brush adapted to be rotated, a shaft upon which said brush is mounted, gearing for operation of the shaft, engaged and disengaged by longitudinal movement of said shaft, and a cam for actuation of said shaft in both directions.

6. A suction sweeper, in combination with a front roller, an adjustable support therefor, adapted to raise and lower said roller, a pair of rear rollers, bearings therefor, a vertically movable mount for each of said bearings and threaded means for raising and lowering said mounts.

7. In a suction sweeper, a motor, a fan connected therewith and walls forming a fan compartment and a lower inlet compartment in communication therewith, the inlet compartment having front edges at an angle to each other and the bottom of the inlet compartment being slitted adjacent these edges at an angle to these edges to provide air inlet openings.

8. In a suction sweeper, a motor, a fan connected therewith and walls forming a fan compartment and a lower inlet compartment in communication therewith, the inlet compartment having its front edges at an angle to each other, the bottom of the inlet compartment being slitted at intervals adjacent its front edges at an angle to the nearer edges with the slits at one edge at an angle to those adjacent the other edge, and the rear portion being slitted at an angle to the slits in the front portion.

THOMAS W. GREEN.